United States Patent
Hetke et al.

(10) Patent No.: US 10,547,944 B2
(45) Date of Patent: Jan. 28, 2020

(54) RING NETWORK OF BLUETOOTH® SPEAKERS

(71) Applicant: Avnera Corporation, Beaverton, OR (US)

(72) Inventors: Theodore Hetke, Hillsboro, OR (US); John Speth, Tigard, OR (US)

(73) Assignee: Avnera Corporation, Beaverton, OR (US)

( * ) Notice: Subject to any disclaimer, the term of this patent is extended or adjusted under 35 U.S.C. 154(b) by 0 days.

(21) Appl. No.: 16/195,340

(22) Filed: Nov. 19, 2018

(65) Prior Publication Data

US 2019/0200128 A1    Jun. 27, 2019

Related U.S. Application Data

(63) Continuation of application No. 16/006,760, filed on Jun. 12, 2018, now Pat. No. 10,142,734, which is a continuation of application No. 15/613,738, filed on Jun. 5, 2017, now Pat. No. 9,998,827, which is a continuation of application No. 15/365,795, filed on Nov. 30, 2016, now Pat. No. 9,699,560, which is a continuation of application No. 14/550,545, filed on Nov. 21, 2014, now Pat. No. 9,544,690.

(51) Int. Cl.
*H04R 3/12* (2006.01)
*H04W 4/80* (2018.01)

(52) U.S. Cl.
CPC .............. *H04R 3/12* (2013.01); *H04W 4/80* (2018.02); *H04R 2420/07* (2013.01); *H04R 2420/09* (2013.01); *H04R 2430/01* (2013.01)

(58) Field of Classification Search
None
See application file for complete search history.

(56) References Cited

U.S. PATENT DOCUMENTS

| | | | |
|---|---|---|---|
| 9,544,690 | B2 | 1/2017 | Hetke et al. |
| 9,699,560 | B2 | 7/2017 | Hetke et al. |
| 9,998,827 | B2 | 6/2018 | Hetke et al. |
| 2004/0147267 | A1 | 7/2004 | Hill et al. |
| 2007/0160225 | A1 | 7/2007 | Seydoux |
| 2008/0205664 | A1 | 8/2008 | Kim et al. |
| 2009/0110204 | A1 | 4/2009 | Walsh et al. |
| 2010/0273417 | A1 | 10/2010 | Tian |

(Continued)

FOREIGN PATENT DOCUMENTS

| | | |
|---|---|---|
| JP | 2007512718 | 5/2007 |
| JP | 2013135372 | 7/2013 |
| WO | WO 2016/081945 | 5/2016 |

OTHER PUBLICATIONS

International Search Report and Written Opinion received in PCT Application No. PCT/US2015/062203, dated Feb. 15, 2016 in 11 pages.

(Continued)

*Primary Examiner* — Paul W Huber
(74) *Attorney, Agent, or Firm* — Knobbe, Martens, Olson & Bear, LLP

(57) ABSTRACT

A method for re-forming a complete ring network of a plurality of Bluetooth® speakers, after a speaker has left an original ring of speakers, the method including detecting that the speaker has left the ring, and reestablishing the ring without the departed speaker. The detection may include a timeout detection if the speaker left without notice, or include receiving notice that the speaker intends to leave.

20 Claims, 8 Drawing Sheets

(56) References Cited

U.S. PATENT DOCUMENTS

| | | |
|---|---|---|
| 2012/0171958 A1 | 7/2012 | Cornett et al. |
| 2012/0308069 A1 | 12/2012 | Stott |
| 2013/0343568 A1 | 12/2013 | Mayman |
| 2014/0029782 A1 | 1/2014 | Rayner |
| 2014/0064492 A1 | 3/2014 | Lakkundi et al. |
| 2014/0254431 A1 | 9/2014 | Yan et al. |
| 2015/0055781 A1 | 2/2015 | Chen |
| 2018/0295445 A1 | 10/2018 | Hetke et al. |

OTHER PUBLICATIONS

"Bluetooth A2DP—Advanced Audio Distribution Profile Specification version 1.3", Audio Video Working Group of the Bluetooth SIG, Jul. 24, 2012 (Jul. 24, 2012), XP055246704, Retrieved from the Internet: URL:https://www.bluetooth.com/specifications/adopted-specifications.

"Bluetooth AVDTP version 1.3 Audio/Video Distribution Transport Protocol Specifications", 2' Jul. 4, 2012 (Jul. 24, 2012), XP055246687, Retrieved from the Internet: URL:https://www.bluetooth.com/specifications/adopted-specifications.

RING NETWORK OF BLUETOOTH® SPEAKERS

CROSS-REFERENCES TO RELATED APPLICATIONS

This patent application is a continuation of U.S. application Ser. No. 16/006,760, filed Jun. 12, 2018 and titled "RING NETWORK OF BLUETOOTH SPEAKERS," which is a continuation of U.S. Non-provisional patent application Ser. No. 15/613,738, filed Jun. 5, 2017, entitled "RING NETWORK OF BLUETOOTH SPEAKERS," which is a continuation of U.S. Non-provisional patent application Ser. No. 15/365,795, filed Nov. 30, 2016, entitled "RING NETWORK OF BLUETOOTH SPEAKERS," which is a continuation of U.S. Non-provisional patent application Ser. No. 14/550,545, filed Nov. 21, 2014, the disclosures of all of which are incorporated herein by reference in their entirety.

FIELD OF THE INVENTION

This disclosure relates to Bluetooth® speakers, and more particularly, to a system for combining a number of Bluetooth® speakers and audio devices in a ring network.

BACKGROUND OF THE INVENTION

Bluetooth® is a wireless technology standard for exchanging data over short distances. Bluetooth® supports audio through an advanced audio distribution profile (A2DP). Most modern mobile phones and audio devices support A2DP and there is a large marketplace for Bluetooth® speakers that can play audio sourced from Bluetooth® audio devices, such as mobile phones.

Most Bluetooth® speakers are single unit objects that render audio in a single place. They usually have low power requirements and are intended for a single listener in a quiet room. Using traditional Bluetooth® standards, a Bluetooth® speaker system can connect up to 7 devices in a single piconet. Audio may be routed from one A2DP source device to another A2DP sink device in the piconet. Several proprietary solutions allow a second A2DP sink device which provides for a total of two speakers to simultaneously play the same audio. Embodiments of the invention address these and other limitations in the prior art.

DETAILED DESCRIPTION

Figure 1:
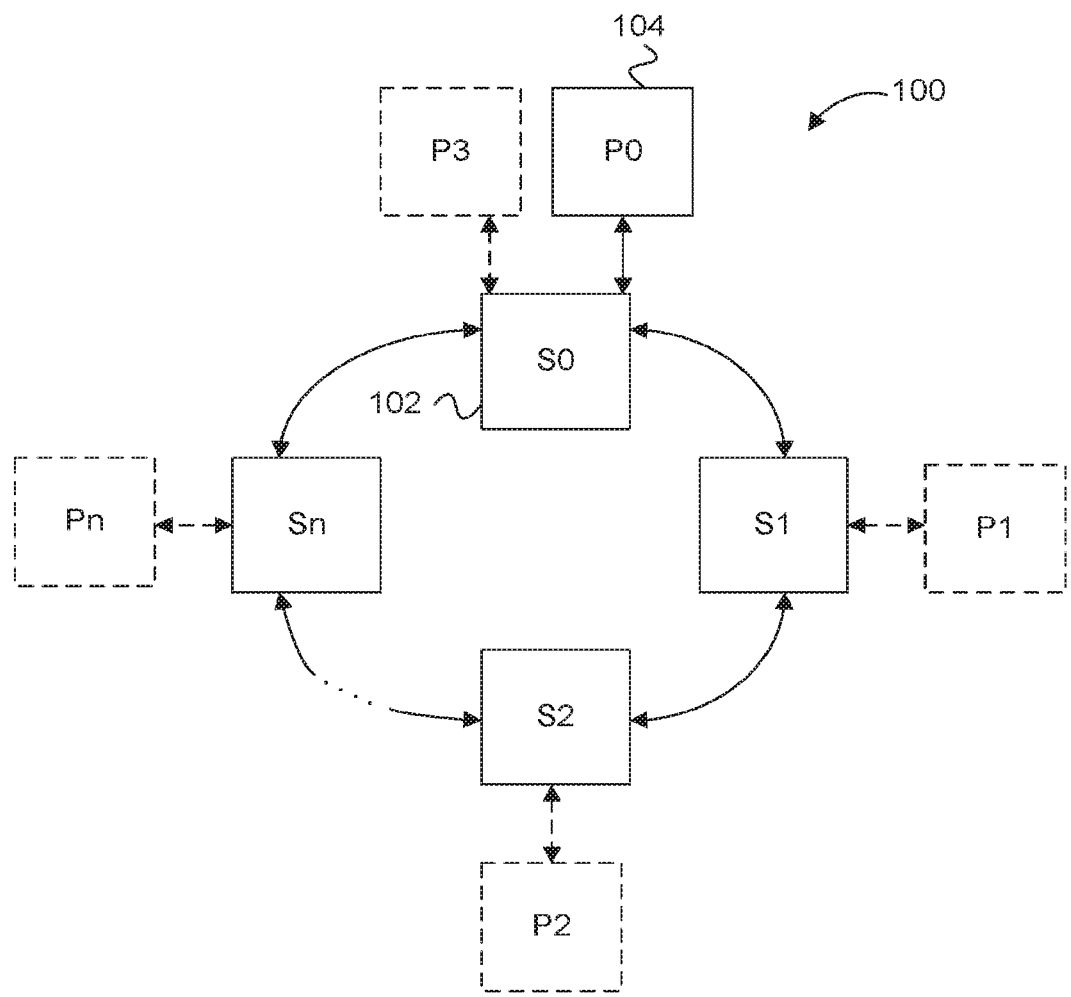
FIG. 1 is a block diagram of a Bluetooth® speaker ring network according to embodiments of the invention.

FIG. 1 illustrates an example Bluetooth® speaker ring network 100, which includes a number of Bluetooth® speakers 102 and a number of audio devices 104. The audio devices 104 may be any audio device that can connect through the Bluetooth® protocol to one of the Bluetooth® speakers. Examples of Bluetooth® enabled speakers include an iPhone, iPod, or Android phones, for example. The ring network 100 can include any number of Bluetooth® speakers 102. Further, as shown in FIG. 1. PI, P2, and P3 through Pn are optional. That is, only one audio device, P0, needs to be connected to the ring network 100 as an audio source. However, up to five audio devices may optionally be connected to every speaker or any number of speakers within the ring network 100.

As used herein, a ring or ring network refers to an organized set of Bluetooth® speakers paired to one another in a chain, in which the end of the chain may connect back to the beginning of the chain to form a ring architecture. A ringleader is a Bluetooth® speaker that is receiving audio from an audio device and forwarding the audio along the ring network. As discussed in more detail below, the ringleader may change at any time.

Data, such as metadata or status data, may be sent from each speaker in the Bluetooth® ring network, to the ringleader audio device. Further, data, such as metadata, may be sent from the ringleader audio device to each speaker in the Bluetooth® ring network, as described in further detail below.

Figure 2:
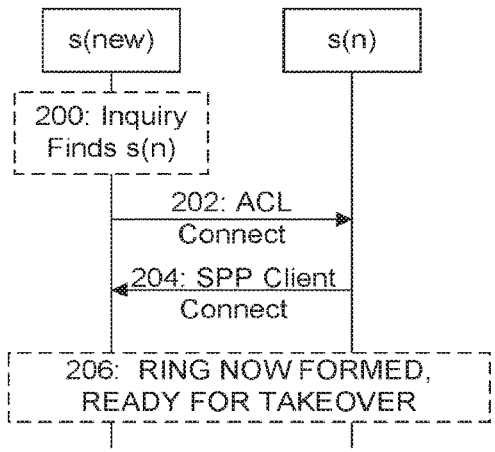
FIG. 2 is a block diagram that illustrates an initial setup of a Bluetooth® speaker ring network according to embodiments of the invention.

FIG. 2 illustrates an example operation for forming a complete ring network for a number of Bluetooth® speakers according to embodiments of the invention. Initially, a first speaker s(n) is placed into a ring network mode by a user. The user may place the first speaker s(n) into the ring network mode by, for example, a button or a switch on the speaker. Then, a second speaker s(new) is also placed into a ring network mode by a user. When each speaker is placed into the ring network mode, each speaker performs a limited inquiry to locate and find other speakers with which to form a network, as seen in operation 200. In FIG. 2, speaker s(n) seeks out and identifies speaker s(new) through the inquiry process. Speaker s(n) may approve or disapprove speaker s(new) joining the ring network.

In operation 202, speaker s(n) establishes a Bluetooth® connection with speaker s(new) and configures the Asynchronous ConnectionLess (ACL) layer. In operation 204 speaker s(new) establishes a new Bluetooth® Serial Port Profile (SPP) connection back to speaker s(n). Prior to or after forming the ring network, zero to five A2DP audio sources may be coupled to each of the Bluetooth® speakers s(n) and s(new).

In more detail, once the identity of speaker s(n) is established by speaker s(new) through the inquiry operation 200, an ACL link is connected between speaker s(new) and speaker s(n) in operation 202. Finally, in operation 204, the SPP client of speaker s(n) connects back to the SPP server of speaker s(new) and the ring is ready for takeover operations 206.

Each SPP client port is assigned a direction, either upstream or downstream, depending on which direction around the ring that port connection leads. The directional designation also indicates which way the audio data flows within the ring network.

Messages, discussed in more detail below, proceed around the ring according to the direction specified in the message. The ring progress is accomplished by forwarding messages received out of the port leading in the direction the message is traveling.

Due to the ring nature of the ring network, message termination rules extinguish messages, otherwise stale messages may be continually sent around the ring network, as mentioned above. In some embodiments, message termination rules include a rule of never forwarding a message back to the originator of the message. If a message reaches an open end of a chain, the message is dropped.

Figure 3:
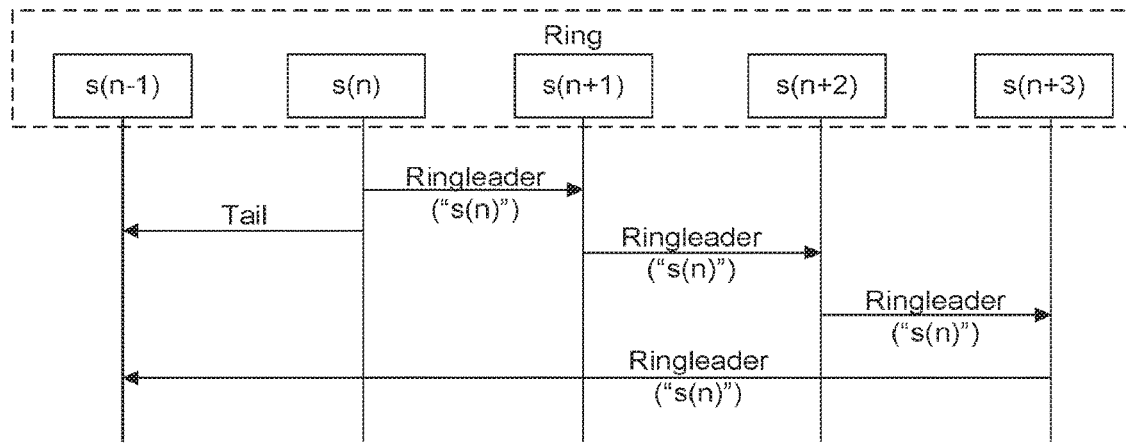
FIG. 3 is a block diagram that illustrates a takeover ringleader procedure according to embodiments of the invention.

Once speaker s(n) and speaker s(new) are connected, the ring is formed in operation 206 and either speaker s(new) or speaker s(n) can become the ringleader. FIG. 3 illustrates a ringleader takeover on a larger ring network. As shown in FIG. 3, a ring network may include speaker s(n−1) through speaker s(n+3). Joining additional speakers to the ring network is discussed in more detail below. When speaker s(n) receives audio data from an audio device, speaker s(n) takes over the ring by sending a ringleader message downstream. Each speaker in the stream forwards the ringleader message to its downstream speaker. A tail message is also sent from speaker s(n) upstream to speaker s(n−1). This tail message provides redundancy to ensure that the system does not go fully circular and start forwarding the stale ringleader message, and later audio, around the ring over and over. When a single speaker receives the ringleader message and the tail message, the ringleader assignment is complete. The new ring leader then forwards audio data around the ring to be played on each of the speakers.

Figure 4:
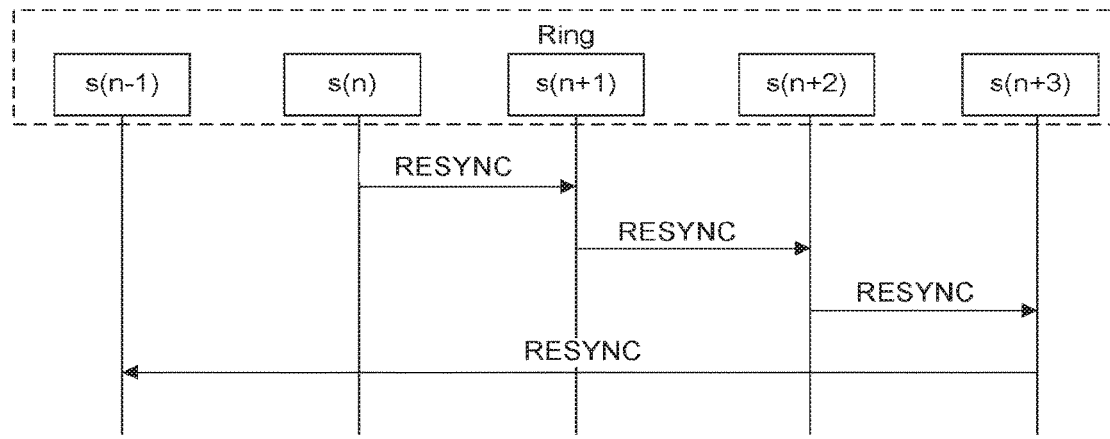
FIG. 4 is a block diagram that illustrates a resynchronization procedure according to embodiments of the invention.

The Bluetooth® ring network may periodically send a resynchronization (resync) signal to ensure all of the speakers in the ring network are aligned. The resync signal is sent from the ringleader speaker s(n) downstream, as illustrated in FIG. 4. During resynchronization, the assignment of upstream or downstream SPP client ports, discussed above, can change if the ring network reverses directions.

Figure 5:
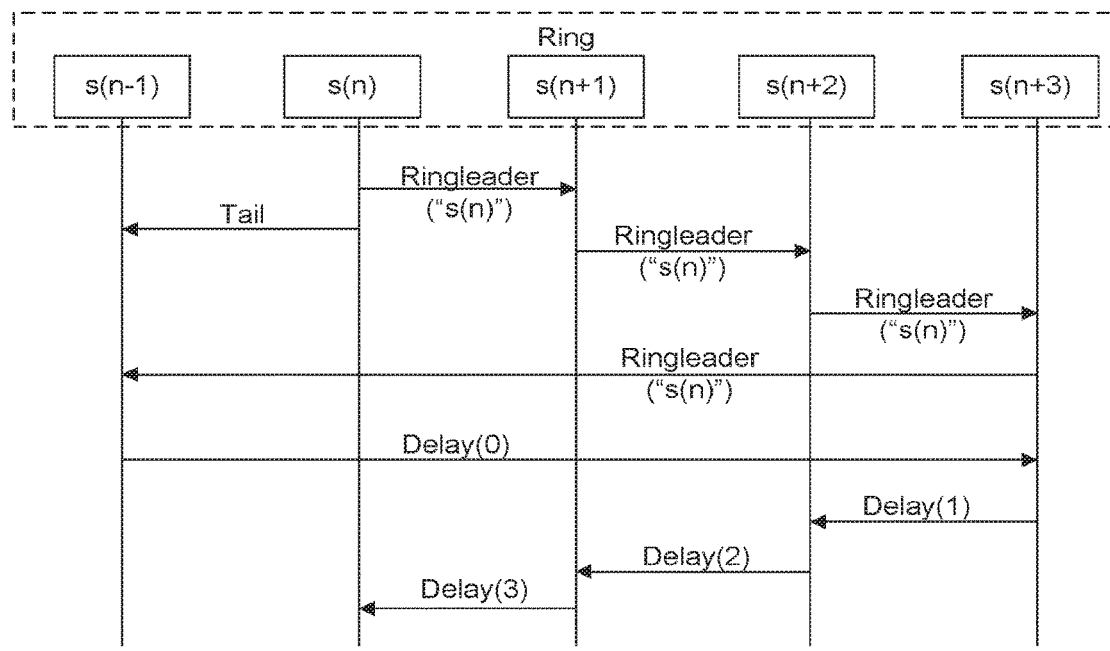
FIG. 5 is a block diagram that illustrates a ringleader takeover procedure with an audio delay compensation procedure according to embodiments of the invention.

Since an audio signal is traveling around the ring network from an audio device connected to the ringleader, some of the speakers may delay playing the audio so all the speakers play the audio signal in unison. In some embodiments the delay is adjusted to account for data transmission delay around the ring. FIG. 5 illustrates a ringleader being established in the system, as discussed above with respect to FIG. 3.

After the ringleader is established in FIG. 5, a delay signal is sent around the ring network upstream, starting with the speaker s(n−1) that received the tail message. In some embodiments, audio delays are made using the assumption that speaker-to-speaker delays in the system are fixed, and by counting the nodes starting at speaker s(n−1) that received the tail message. The delay message sent around the ring provides each speaker with a count of how many delay units to use, as shown in FIG. 5.

Figure 6:
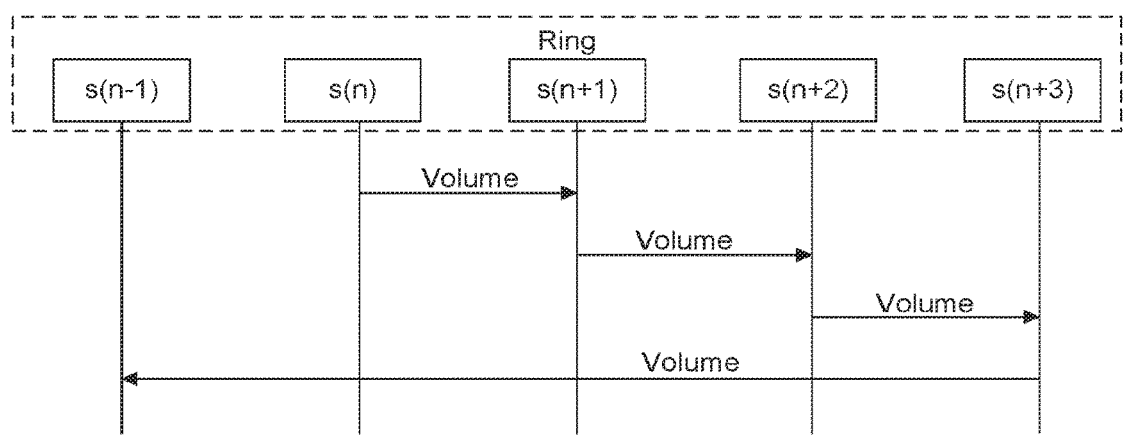
FIG. 6 is a block diagram that illustrates a volume adjustment procedure according to embodiments of the invention.

The volume on the audio device connected to the ringleader speaker s(n) may be adjusted, and the volume on each of the speakers is adjusted. Then, a volume message may be sent around the ring, as illustrated in FIG. 6. In more detail, a user may adjust the volume on their audio device. This adjustment then sends a new audio volume signal to the speaker the audio device is connected with on the ring network. In FIG. 6, this is speaker s(n). Speaker s(n) then receives the new audio volume signal from the audio device, and sends this new audio volume signal to its downstream speaker s(n+1). The downstream speaker s(n+1) then also sends the audio volume signal downstream, which continues until each speaker has received the new audio volume signal and has adjusted its audio volume. The audio volume signal may stop circulating the ring network when the audio volume signal received is the same audio volume the speaker is already set at. Or it may stop circulating the ring network when a speaker receives the new audio volume signal and a tail message, as described above (not shown). Although adjusting the audio volume is shown in FIG. 6, any audio control signal, such as stop, pause, next audio, previous audio, restart audio, fast forward audio, and reverse audio, may be sent from the audio device to its connected speakers and sent around the ring network.

Further, as mentioned above, not only audio control signals are sent around the network. For example, the audio device may send data, such as metadata including a audio title, artist information, or other audio identification information, to the Bluetooth® speaker connected to the audio device. The data is then transferred downstream through the ring network to each of the Bluetooth® speakers. Such data may then be displayed on a display of the speakers. Further, metadata from each of the speakers, such as speaker name and status, may be sent around the ring and forwarded back to the audio device. The audio device may then display information about each of the speakers connected in the ring network.

Figure 7:
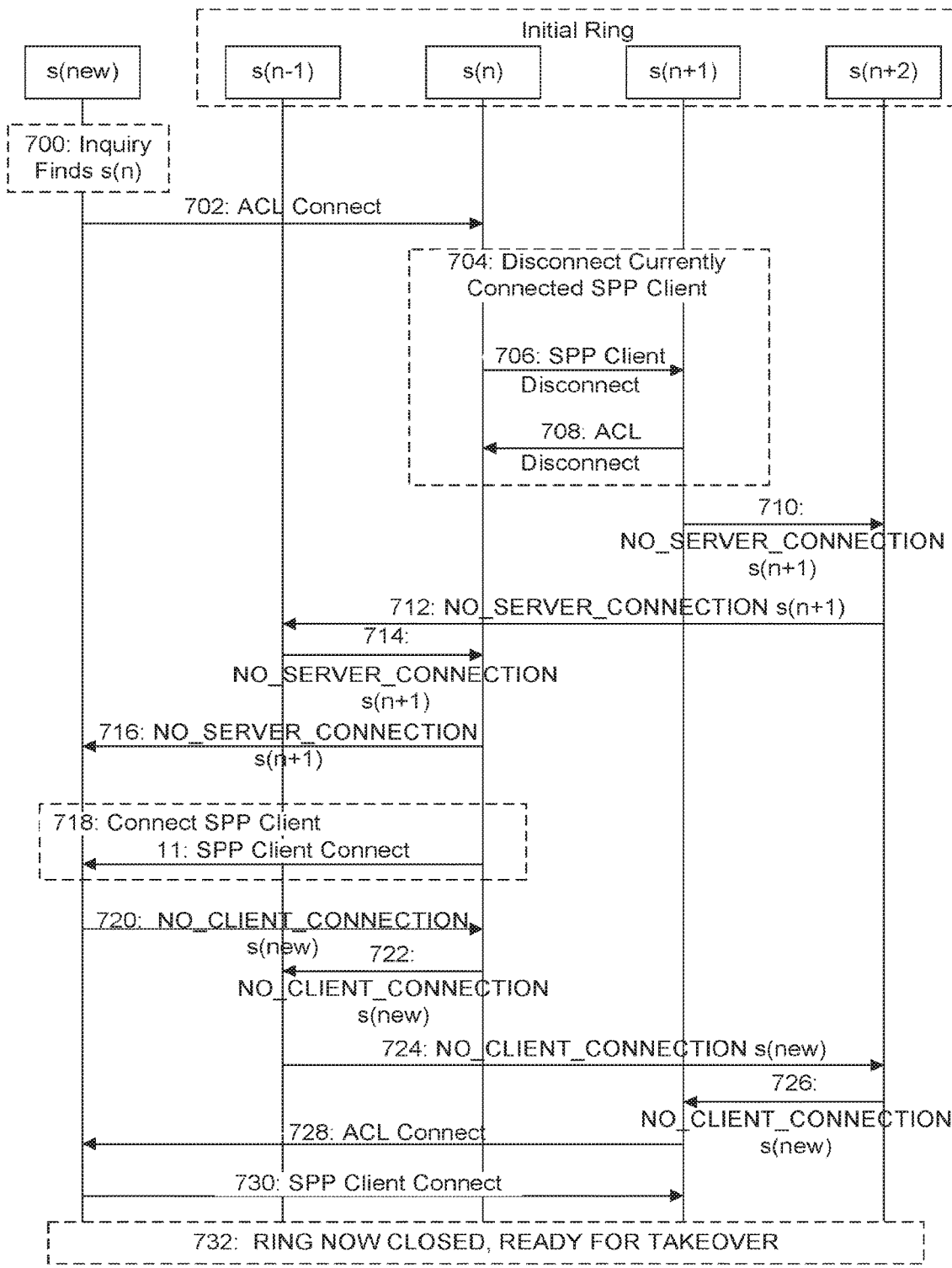
FIG. 7 is a block diagram that illustrates a ring network join procedure for a new Bluetooth® speaker according to embodiments of the invention.

As discussed above, any number of speakers may join the ring network. A speaker s(new) can join the ring network, as shown in the example embodiment of FIG. 7. As discussed above with forming the ring network, the speaker s(new) is placed in a ring network mode by a user using a button or a switch, for example, and the speaker s(new) will inquire for speaker s(n) at operation 700. This may be performed by the speaker s(n) outputting a pairing signal once speaker s(new) is placed in the ring network mode. In the example embodiment of FIG. 7, s(n) detects the pairing signal of speaker s(new) in operation 700. In operation 702, speaker s(new) connects at the ACL level with speaker s(n). That is, speaker s(new) is configured to allow speaker s(n) to send audio data and signals to speaker s(new) and registers speaker s(n) as the upstream speaker of speaker s(new).

Then, in operation 704, speaker s(n) and speaker s(n+1) are disconnected or deleted in the configurable speaker registers of each, which includes disconnecting the SPP client in operation 706 from the SPP port of speaker s(n), so speaker s(n+1) is no longer connected as the downstream speaker of s(n+1). In operation 708, speaker s(n) is reconfigured to remove access to speaker s(n+1) so that speaker s(n+1) is no longer registered as the downstream speaker of s(n).

Since speaker s(n) has been disconnected from speaker s(n+1), a no server connection message is sent from speaker s(n+1) downstream to speaker s(n−1) in operations 710, 712 and 714. A no server connection message is also sent to speaker s(new) from speaker s(n) at operation 716. In operation 718, speaker s(n) is connected to the SPP client connect of speaker s(new) in the configurable speaker register. Then, a no client connection message is sent from speaker s(new) to speaker s(n) in operation 720. Speaker s(n) then sends a no client connection message to speaker s(n−1) in operation 722, and speaker s(n−1) sends a no client connection message to speaker s(n+2) in operation 724, and a no client connection from speaker s(n+2) to speaker s(n+1) in operation 726. In operation 728, speaker s(n+1) connects at the ACL level to speaker s(new) in the configurable speaker register. In operation 730, speaker s(new) and speaker s(n+1) connect the SPP client in the configurable speaker register of each. Speaker s(new) is then added to the ring in between speaker s(n) and speaker s(n+1) and the ring is closed in operation 732 and any of the speakers in the new ring can takeover if audio from an audio device is received at that speaker.

Described in another manner, when an inquiry from a new Bluetooth® speaker is received at speaker s(n), speaker s(n) disconnects, or deletes, the address of the downstream Bluetooth® speaker. The address of the new Bluetooth® speaker s(new) is added to speaker s(n) as the new downstream speaker. The address of the speaker s(n+1), which was disconnected from speaker s(n) is then added as the downstream address of speaker s(new), while the address of speaker s(n) is added as the upstream address in speaker s(new). Finally, the address of speaker s(new) is added as the upstream speaker of speaker s(n+1). Then a new ring network is formed with speaker s(new) located in the ring downstream from speaker s(n) and upstream from speaker s(n+1).

Figure 8:
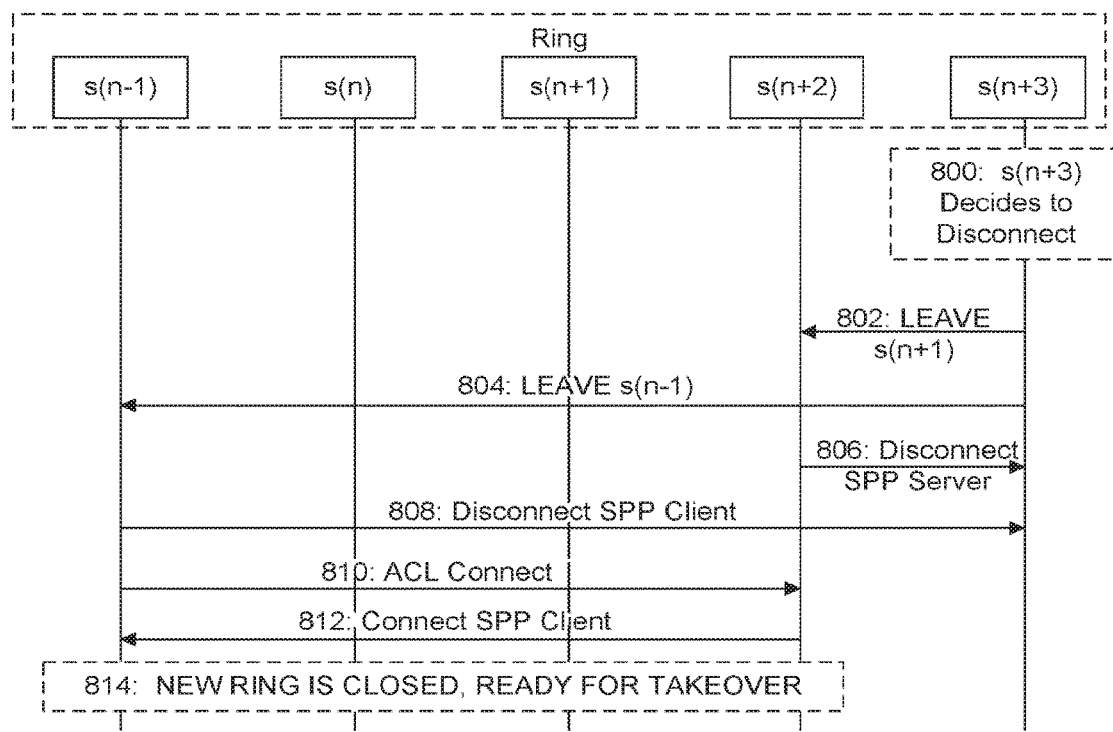
FIG. 8 is a block diagram that illustrates a controlled Bluetooth® speaker leave procedure according to embodiments of the invention.
Figure 9:
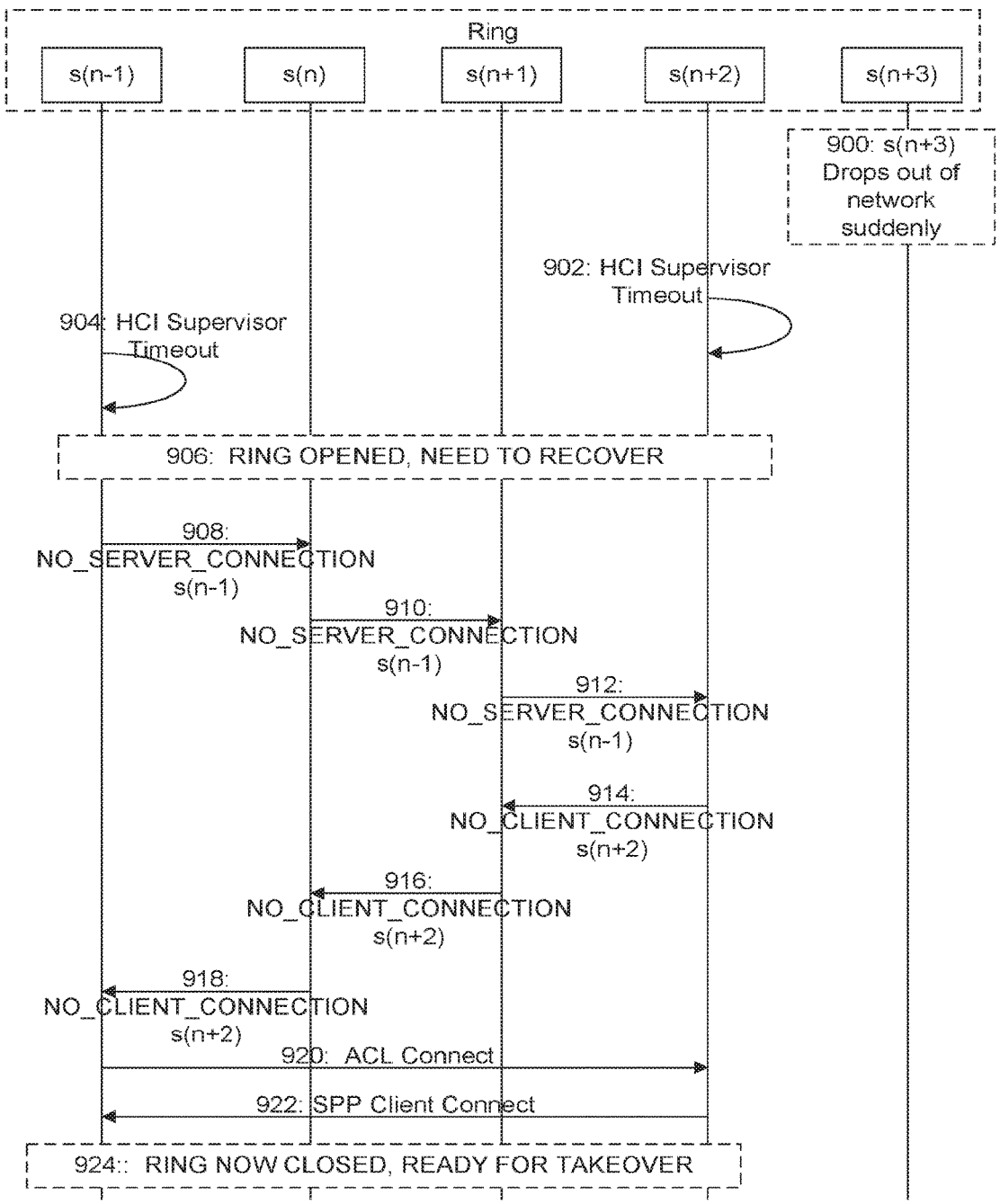
FIG. 9 is a block diagram that illustrates an uncontrolled Bluetooth® speaker leave procedure according to embodiments of the invention.

Speakers may drop out of the network in a controlled manner, as shown in FIG. 8, or in an unexpected manner, as shown in FIG. 9. For example, as shown in FIG. 8, speaker s(n+3) leaves the ring network in operation 800. A leave message is sent in operations 802 and 804 to the upstream speaker s(n+2) and the downstream speaker s(n−1). Once the leave messages have been sent in operations 806 and 808, speaker s(n+2) and speaker s(n−1) disconnect the SPP client from speaker s(n+3) or, stated another way, the address of each is removed from the respective configurable register. Speaker s(n−1) connects at the ACL level to speaker s(n+2) at operation 810 and speaker s(n+2) connects the SPP client to speaker s(n−1) in operation 812 in the respect configurable registers. Then the new ring network is formed in 814 without speaker s(n+3).

An example of a controlled leave may be when one of the audio devices connected to the speakers receives a phone call. When the audio device receives the phone call, the speaker connected to that audio device drops out of the ring network and sends a leave message around the ring network. The phone call would then only play on the speaker connected to the audio device, and not on all of the speakers in the newly formed ring network. The receiver of the phone call decides whether to take the call on the phone or the speaker. After the phone call is finished, speaker s(n+3) may rejoin the network using the operation discussed with respect to FIG. 7.

As shown in FIG. 9, a speaker may also suddenly drop out of the ring network. For example, the speaker may go out of range or power off. In such a case, the ring network is broken and a ring recovery protocol is used, as illustrated in FIG. 9.

In operation 900, speaker s(n+3) suddenly drops out of the network. There is a host controller interface (HCI) supervisor timeout in operations 902 and 904 at the upstream speaker s(n+2) and the downstream speaker s(n−1). This timeout occurs when the upstream and downstream speakers are unable to connect to the speaker that has dropped out. During this timeout, the speakers speaker s(n+2) and speaker s(n−1) may try to reconnect with speaker s(n+3). In operation 906, it is recognized that the ring is open and may need to recover. Then, a no server connection message is sent downstream starting at speaker s(n−1) in operations 908, 910, and 912. And a no client connection message is sent upstream starting at speaker s(n+2) in operations 914, 916, and 918. Then, speaker s(n−1) and speaker s(n+1) establish a connection at the ACL level and an SPP client connection in operations 920 and 922 in their respective configurable registers. In operation 924, the new ring network without speaker s(n+3) is formed, and ready for any of the speakers remaining in the ring network to take over. After the new ring network is formed, speaker s(n+3) may rejoin the ring network, if desired, using the operation discussed above with respect to FIG. 7.

An example is as follows. A first person sets up two speakers to create a left plus right stereo setup. The first speaker is set in the ring network mode. A pair button is pressed on the first speaker, and the first person's iPhone is then paired to the first speaker as the audio device.

If the first speaker has never been paired before, pressing pair is unnecessary, as the speakers will search for any device to pair with when in the ring network mode. Further, if there are no devices yet connected to the speaker when in the pair mode, then the speaker will search for a device to connect with without a pair button being pressed.

The first person then sets the second speaker into the ring network mode. Since the first speaker is connected to the iPhone, the first person may press the pair button the first speaker to pair it to the second speaker. Again, if the second speaker has been paired before, then the user may press the pair button the second speaker. If it has not been paired before, as this is the first power on, it should already be searching for a device to pair with.

When the second speaker is paired with the first speaker, the first person may press play on her iPhone, and audio comes out of both speakers. Left audio will come out of the speaker paired directly to the iPhone, and right audio comes out of the second speaker. This is always the case for a two speaker ring network.

A second person may wish to also connect a speaker to the ring network formed by the first and second speakers owned by the first person. The second person may place his speaker in the ring network mode. The first person then presses the pair button on one of his speakers, and the second person presses the pair button on his speaker. The speakers may include a light source to indicate when the speakers are connected. The light source may blink after the user presses the pair button on the speaker. When the speaker has connected to the new device, the light source on the speaker goes solid. When the speaker of the second person is added to the ring network, the audio begins playing out of all of the speakers. Now that three speakers are connected, mono audio plays out of each of the speakers.

A third person may also wish to join the ring network. In that case, the first person again presses the pair button on one of his speakers. The third person may put his speaker in the ring network mode and press the pair button. When the speakers are connected, as shown by a solid light from the light source on both speakers, audio will begin playing out of the speaker of the third person. If an audio device is also paired to the speaker of the third person, the third person can take control of the ring network of speakers by pressing play on his audio device, such as an iPad, and the new audio beings playing on all speakers. The last person to hit play on their audio device takes control of the ring network.

A fourth person may wish to add another four speakers to the ring network. The fourth person may press the pair button on any of the speakers already in the ring network, and then press the pair button on one of his four speakers. This is repeated for each of the speakers, and all of the speakers will then be added to the ring network, which now comprises eight speakers.

A fifth person may not have a speaker, but wants to share audio from his audio device. The fifth person may press the pair button on one of the speakers. Then, the audio device is paired to the speaker, and the fifth person may press play and takeover the ring network.

Figure 10:
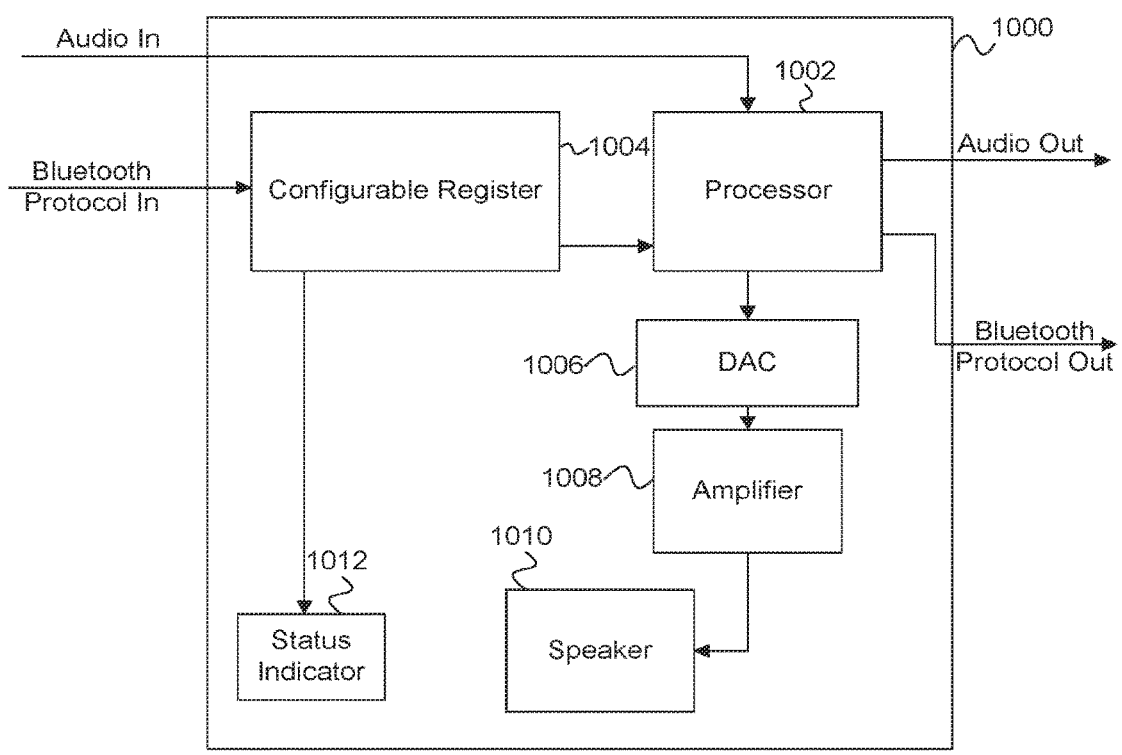
FIG. 10 is a block diagram of an example speaker used within the ring network.

FIG. 10 shows a block diagram of an example speaker 1000 used in the ring network. The speaker includes an audio in portion, which is routed to the processor 1002, and a Bluetooth® protocol in, which is routed to the configurable register 1004. The Bluetooth® protocol allows for registering the upstream and downstream speakers to the current speaker. The audio data and the Bluetooth® protocol data are routed to the processor 1002. Audio data is sent from the processor to the next speaker in the ring network, as well as Bluetooth® protocol information. The processor 1002 also forwards to the audio data to a digital-to-analog convert 1006, when sends the audio data to an amplifier 1008 and ultimately a speaker 1010 to play the audio data. The configurable register 1004 is also connected to a status indicator 1012 to allow a user to see that the speaker is connected within the ring network. The status indicator 1012 may be, for example, a light, as discussed above. However, any status indicator may be used that allows a user to see that the speakers are connected.

Having described and illustrated the principles of the disclosed technology in a preferred embodiment thereof, it should be apparent that the disclosed technology can be modified in arrangement and detail without departing from such principles. We claim all modifications and variations coming within the spirit and scope of the following claims.

We claim:

1. A wireless speaker in wireless communication with a plurality of wireless speakers, the wireless speaker and the plurality of wireless speakers wirelessly connected in a first network with a ring topology, the wireless speaker configured to:
   detect that a first wireless speaker from the plurality of wireless speakers is no longer in communication with the wireless speaker;
   generate a first message indicating a loss of connection to the first wireless speaker;
   transmit the first message in a first direction around the first network to identify which speaker from the plurality of wireless speakers is the first wireless speaker; and
   reform the first network without the first wireless speaker to obtain a second network with a ring topology by at least establishing a communication link between a second wireless speaker and a third wireless speaker, and receiving a connection profile from the third wireless speaker, the second wireless speaker previously adjacent to the first wireless speaker in a second direction within the first network and the third wireless speaker previously adjacent to the first wireless speaker in the first direction within the first network.

2. The wireless speaker of claim 1 wherein the wireless speaker is the second wireless speaker.

3. The wireless speaker of claim 1 wherein the wireless speaker detects that the first wireless speaker is no longer in communication with the wireless speaker by detecting an occurrence of a timeout condition.

4. The wireless speaker of claim 1 wherein the communication link is established using an Asynchronous Connectionless-Link protocol.

5. The wireless speaker of claim 1 wherein the connection profile is a Serial Port Profile.

6. The wireless speaker of claim 1 further comprising receiving a second message confirming the loss of connection to the first wireless speaker.

7. The wireless speaker of claim 6 wherein the second message is received in the second direction around the first network.

8. The wireless speaker of claim 6 wherein the second message is received from the third wireless speaker.

9. The wireless speaker of claim 1 further configured to:
   receive a pairing request message from the first wireless speaker after the first network is reformed without the first wireless speaker; and
   reform the second network with the first wireless speaker as a third network with a ring topology.

10. The wireless speaker of claim 9 wherein reforming the second network as the third network includes at least:
    obtaining an address of a previously adjacent wireless speaker in a first direction around the second network;
    providing the address of the previously adjacent wireless speaker to the first wireless speaker for registration as a currently adjacent wireless speaker in the first direction around the second network;
    providing an address of the wireless speaker to the first wireless speaker for registration as a currently adjacent wireless speaker in a second direction around the second network; and
    registering an address of the first wireless speaker as an adjacent wireless speaker in the first direction around the second network.

11. The wireless speaker of claim 9 wherein the third network is the same as the first network.

12. The wireless speaker of claim 1 further configured to:
    receive an audio signal; and
    transmit the audio signal to each additional wireless speaker in the second network for output by each of the additional wireless speakers.

13. The wireless speaker of claim 12 wherein transmitting the audio signal to each additional wireless speaker includes transmitting to each of the additional wireless speakers a delay specific to each of the additional wireless speakers to synchronize output of the audio signal.

14. A method of maintaining a network of wireless speakers in a ring topology, the method comprising:
    detecting, by a ringleader wireless speaker, that a first wireless speaker from a plurality of wireless speakers connected in a first network with a ring topology is no longer in communication with other wireless speakers from the plurality of wireless speakers, the plurality of wireless speakers including the ringleader wireless speaker;
    generating, by the ringleader wireless speaker, a first message indicating a loss of connection to the first wireless speaker;
    transmitting, by the ringleader wireless speaker, the first message in a first direction around the first network to identify which speaker from the plurality of wireless speakers is the first wireless speaker;
    receiving in a second direction, by the ringleader wireless speaker, a second message identifying the first wireless speaker from the plurality of wireless speakers as no longer being in communication with the first network; and reforming the first network without the first wireless speaker to obtain a second network with a ring topology by at least establishing a communication link with a second wireless speaker, and receiving a connection profile from the second wireless speaker, the second wireless speaker previously adjacent to the first wireless speaker in a second direction within the first network.

15. The method of claim 14 wherein detecting that the first wireless speaker is no longer in communication with the other wireless speakers from the plurality of wireless speakers includes detecting an occurrence of a timeout condition.

16. The method of claim 14 wherein the communication link is established using an Asynchronous Connectionless-Link protocol and the connection profile is a Serial Port Profile.

17. The method of claim 14 further comprising:
determining a communication delay between the ringleader wireless speaker and a first recipient wireless speaker in the second network;
receiving, at the ringleader wireless device, audio data from an audio device; and
transmitting to a second recipient wireless speaker, by the ringleader wireless speaker, the audio data and an audio output delay based on the communication delay enabling the audio data to be output synchronously by at least the first recipient wireless speaker and the second recipient wireless speaker.

18. The method of claim 14 further comprising:
receiving, at a non-ringleader wireless device of the second network, audio data from an audio device;
transmitting, by the non-ringleader wireless device, a first ringleader message in a first direction in the second network;
transmitting, by the non-ringleader wireless device, a second ringleader message in a second direction in the second network; and
upon a recipient wireless device in the second network receiving both the first ringleader message and the second ringleader message, setting the non-ringleader wireless device as the ringleader wireless device.

19. A wireless network connected in a ring topology comprising:
a first wireless speaker connected to a second wireless speaker in a first direction of the ring topology;
a third wireless speaker connected to the first wireless speaker in the first direction of the ring topology and connected to the second wireless speaker in a second direction of the ring topology, and configured to: detect a gap within the ring topology associated with a loss of connection to a wireless speaker; generate a first message indicating the loss of connection to the wireless speaker; transmit the first message in the first direction to identify the wireless speaker; receiving a second message from the first wireless speaker; determine that the second wireless speaker is no longer communicating with the wireless network based at least on the second message; and reform the wireless network without the second wireless speaker.

20. The wireless network of claim 19 wherein the third wireless speaker is further configured to reform the wireless network without the second wireless speaker by at least:
establishing a communication link with the first wireless speaker in the second direction of the ring topology; and
receiving a connection profile from the first wireless speaker for communicating data with the first wireless speaker over the communication link.

* * * * *